April 7, 1925.                                                                 1,532,972
S. O. WHITE
BRAKE LEVER
Original Filed July 18, 1923

INVENTOR.
Samuel O. White,
BY
Hood + Hahn
ATTORNEYS

Patented Apr. 7, 1925.

1,532,972

UNITED STATES PATENT OFFICE.

SAMUEL O. WHITE, OF MUNCIE, INDIANA, ASSIGNOR TO WARNER GEAR COMPANY, OF MUNCIE, INDIANA, A CORPORATION OF INDIANA.

BRAKE LEVER.

Original application filed July 18, 1923, Serial No. 652,268. Divided and this application filed May 26, 1924. Serial No. 715,938.

*To all whom it may concern:*

Be it known that I, SAMUEL O. WHITE, a citizen of the United States, residing at Muncie, in the county of Delaware and State of Indiana, have invented a new and useful Brake Lever, of which the following is a specification.

My invention relates to improvements in hand levers and is particularly applicable to hand levers for operating the brake mechanism for automobiles.

For the purpose of disclosing my invention I have illustrated one embodiment thereof in the accompanying drawing in which Fig. 1 is a side elevation of so much of a transmission casing as is necessary for understanding my invention, and a side elevation of my improved form of hand lever;

Figure 1:
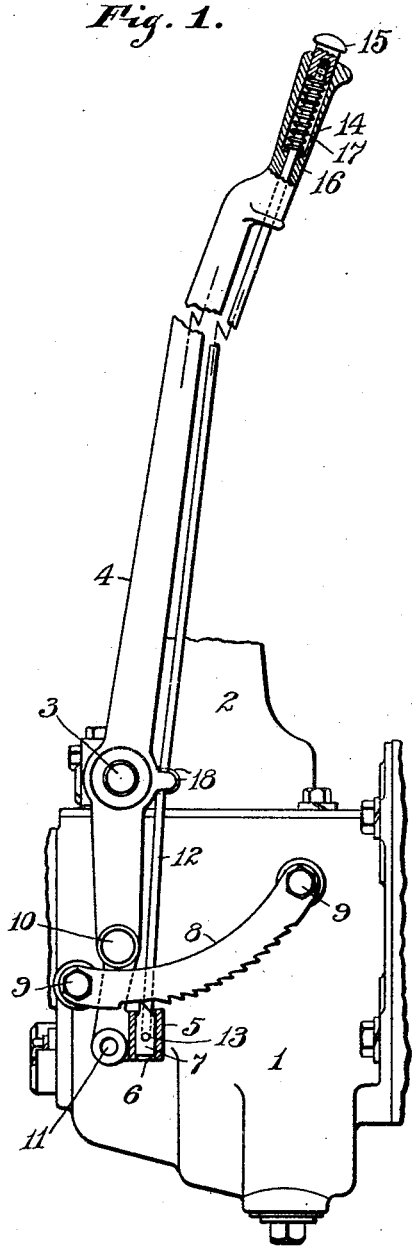
Figure 2:
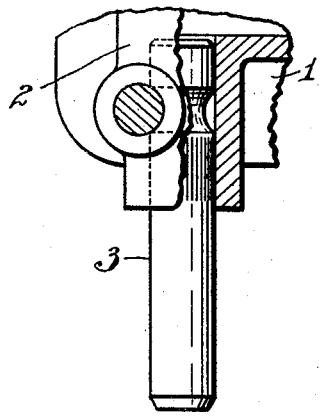
Fig. 2 is a detail section of the stud mounting for the hand lever.
Figure 3:
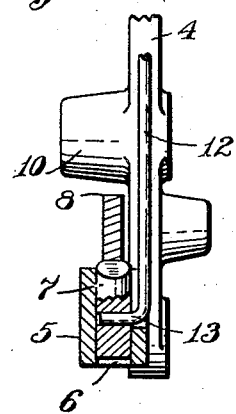
Fig. 3 is a detail section of the lever dog.

In the embodiment illustrated, the transmission casing 1 is provided with a gear shifting lever frame 2 which is bolted on the top of the casing and carries the gear shifter lever. This frame has secured to one side thereof, a brake lever stud 3 on which is pivotally mounted the brake lever 4. This lever, at its lower end, is provided with an offset socket member 5 having formed therein a vertically extending socket 6 in which is adapted to reciprocate a dog 7 arranged to engage the teeth of the brake sector 8. This brake sector is secured by suitable bolts 9, to one side of the transmission casing and is spaced apart therefrom to permit the lower end of the brake lever 4 to lie between the sector 8 and the side of the casing. Due to the fact that the socket 6 is in an offset portion of the brake lever at its lower end, the dog 7 will, when the parts are assembled, be directly under the brake sector 8. The lever 4 is also provided with a second offset lug 10 which may be drilled to form an eye for the reception of a connecting means extending between the lever and the brake. The lower end of the brake lever is provided with an eye 11, by means of which a link for operating the brake mechanism may be connected with the lever. The connection points 10 and 11 provide alternative points for the connection of the brake operating rod or link, depending upon conditions.

The dog 7 is urged upwardly and into an engaging position with respect to the sector 8 by means of an operating rod 12, the lower end of which is turned at right angles, as at 13, and engages in an opening in the dog, the wall of the socket 6 being provided with a longitudinal slot to accommodate this portion 13. The rod extends upwardly and parallel with the brake lever and at its upper end extends through a hollow handle 14 formed in the lever and has secured at its top a thumb button 15 between which and a shoulder 16 in the handle is interposed a coil spring 17 which urges the rod in a direction to cause the dog to engage the teeth of the brake sector. At the point where the rod passes the hub of the brake lever, it is held in position against lateral deflection between a pair of guide lugs 18 which thereby prevent the portion 13 from becoming detached from the dog.

This application is a division of my copending application for improvement in transmissions, filed July 18, 1923, Serial No. 652,268.

I claim as my invention:

1. The combination with a transmission casing, of an arcuate toothed segment mounted on one side of said casing and spaced apart therefrom, a brake lever pivoted on said casing having a socket at its lower end, a dog vertically movable in said socket and arranged to co-operate with said segment, an operating rod for said dog extending parallel with said lever and having its upper end projecting through an opening in the handle of said lever, a retaining spring tending to urge said rod in a direction to cause the dog to engage the teeth of said segment, said rod having a transversely extending projection at its lower end engaging said dog, and a guide member near the lower end of said lever for said rod to maintain the same against lateral displacement and thereby hold the projection into engagement with the dog.

2. The combination with a transmission casing, of a toothed segment mounted on one side thereof and spaced apart therefrom, a brake lever pivotally mounted at one side of said casing having an offset portion at its lower end and an offset handle portion at its upper end, said lower offset being provided with a vertically extending socket having a vertical slot in one wall thereof, a dog slidably mounted in said socket and adapted to engage the teeth of said segment, an operating rod having a transversely extending pin engaging said dog and slidable in said slot, the upper end of said rod being arranged to pass through an opening in the handle of the lever, a coil spring surrounding said rod and arranged within said handle and interposed between a shoulder in said handle and an operating button on said rod and tending to urge the rod in a direction to cause the dog to engage the teeth of the segment, and a guide member near the lower end of said lever for said rod to prevent lateral displacement of the rod and hold the projection thereon in engagement with the dog.

3. The combination with a transmission casing, of an arcuate toothed segment mounted on one side of said casing and spaced apart therefrom, a brake lever pivoted on said casing having a socket at its lower end and arranged beneath said segment, a dog vertically movable in said socket for co-operation with said segment, an operating rod for said dog extending parallel with said lever and having a transversely extending portion at its lower end engaging said dog.

4. The combination with a transmission casing, of an arcuate toothed segment mounted on one side of said casing and spaced apart therefrom, a brake lever pivoted on said casing having an offset and a socket in said offset immediately beneath said segment, a dog vertically movable in said socket and arranged to co-operate with said segment, and operating rod for said dog extending parallel with said lever and having a transversely extending projection at its lower end engaging said dog and spring operated means on said handle connecting with said rod for urging the dog into engagement with the segment.

5. The combination with a transmission casing, of a toothed segment mounted on one side thereof and spaced apart therefrom, a brake lever pivotally mounted at one side of said casing having an offset portion at its lower end provided with a vertically extending socket having a vertical slot in one wall thereof, a dog slidably mounted in said socket and adapted to engage the teeth of said segment and an operating rod extending parallel with said lever and having a transversely extending pin engaging said dog and slidable in said slot.

6. The combination with a transmission casing, of a toothed segment mounted on one side thereof and spaced apart therefrom, a brake lever pivotally mounted at one side of said casing and having its lower end extending between the casing and the segment and having an offset portion at its lower end provided with a vertically extending socket, a dog slidably mounted in said socket and adapted to engage the teeth of said segment and an operating rod extending parallel with the lever for operating said dog.

In witness whereof, I, SAMUEL O. WHITE, have hereunto set my hand at Muncie, Indiana, this 23rd day of May, A. D. one thousand nine hundred and twenty-four.

SAMUEL O. WHITE.